(12) United States Patent
Schellingerhout et al.

(10) Patent No.: US 8,477,250 B2
(45) Date of Patent: Jul. 2, 2013

(54) CIRCULAR DISPLAYS

(75) Inventors: Nicolaas Willem Schellingerhout, Eindhoven (NL); Kenny Darmadji, Delft (NL); Raymond Wilhelmus Louis Lafarre, Helmond (NL); Hjalmar Edzer Ayco Huitema, Veldhoven (NL)

(73) Assignee: Creator Technology B.V., Breda (NL)

( * ) Notice: Subject to any disclaimer, the term of this patent is extended or adjusted under 35 U.S.C. 154(b) by 1172 days.

(21) Appl. No.: 12/097,594

(22) PCT Filed: Dec. 11, 2006

(86) PCT No.: PCT/IB2006/054751
§ 371 (c)(1),
(2), (4) Date: Feb. 17, 2009

(87) PCT Pub. No.: WO2007/069187
PCT Pub. Date: Jun. 21, 2007

(65) Prior Publication Data
US 2009/0267870 A1    Oct. 29, 2009

Related U.S. Application Data

(60) Provisional application No. 60/751,406, filed on Dec. 16, 2005.

(51) Int. Cl.
*H04N 5/74* (2006.01)
(52) U.S. Cl.
USPC .............................. 348/839; 348/838; 345/55
(58) Field of Classification Search
USPC ....................................................... 348/839
See application file for complete search history.

(56) References Cited

U.S. PATENT DOCUMENTS

| 6,900,851 B2 * | 5/2005 | Morrison et al. | 349/25 |
| 2005/0225690 A1 * | 10/2005 | Battersby | 349/41 |
| 2008/0211733 A1 * | 9/2008 | Huitema | 345/3.1 |
| 2010/0177020 A1 * | 7/2010 | Bemelmans et al. | 345/55 |

FOREIGN PATENT DOCUMENTS

| JP | 11 272205 A | | 10/1999 |
| WO | WO 2005/015302 A | | 2/2005 |
| WO | WO2005091110 | * | 9/2005 |
| WO | WO 2005/114309 A1 | | 12/2005 |

OTHER PUBLICATIONS

International Search Report for PCT/IB2006/054751 dated Jul. 18, 2007.

* cited by examiner

*Primary Examiner* — Anner Holder

(57) ABSTRACT

A rollable circular display device (10) is disclosed, comprising, in one embodiment, a ring-shaped display (6) expandable in two dimensions between a stored configuration and an expanded configuration and a body for winding the ring-shaped display in the stored configuration. In another embodiment, the rollable circular display device (10) comprises a housing (20), a circular display (6) expandable in two dimensions between a stored configuration in which the circular display (6) is stored within the housing (20) and an expanded configuration in which the circular display is fully viewable, and an inner cone, being arranged co-axially within the housing (20) and rotatable within the housing, wherein the circular display (6) is wound around the inner cone in the stored configuration.

35 Claims, 10 Drawing Sheets

CIRCULAR DISPLAYS

The present invention disclosed herein generally relates to display devices. More particularly, exemplary embodiments of the invention concern a display device having a small form factor when not in use.

A rollable display device having a large display area and excellent portability is regarded as an ideal form of a display device. Although volume, dimension, weight, successive operation time, and the like can be considered indices of portability, description will be given primarily of the simplest factor, namely, the device dimensions when the display is not being used in a stored configuration. Rollable displays are very practical because of the relatively small volume required to store them in the rolled up state which greatly enhances the portability of this type of device.

Figure 1A:
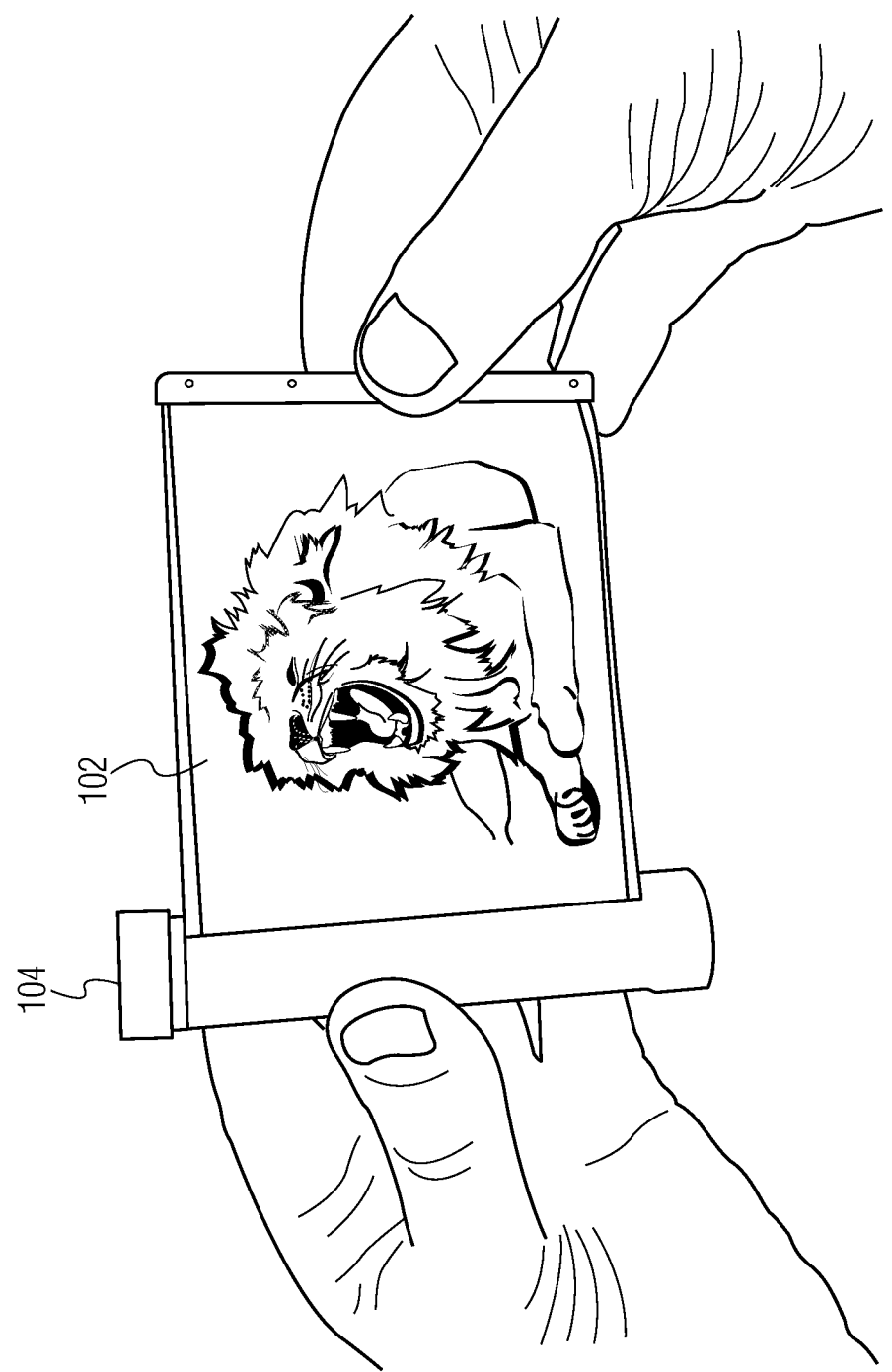

FIG. 1a shows a known "roll-up" configuration for a display in which a display area 102 is stored by rolling it tightly around a cylinder 104 within a protective housing. Upon unrolling the display area 102 at a predetermined length, visual information may be presented to the user thereon. The "roll-up" configuration advantageously provides a small form factor for the display. One drawback of the configuration, however, is that it allows only one dimension of the display to be reduced. That is, when rolling up the display 102 around the cylinder 104, the width of the display is reducable to a small radius but the height is unchanged.

Figure 1B:

FIG. 1b shows a second known "wrap-up" configuration for a display in which a display area 106 is stored by winding it tightly around a body portion 108. Upon unwrapping the display area 108 at a predetermined length, visual information may be presented to the user thereon. Similar to the configuration described with reference to FIG. 1a, the "wrap-up" configuration of FIG. 1b advantageously provides a small form factor for the display. This configuration suffers from the same drawback of the configuration of FIG. 1a in that it only allows one dimension of the display to be reduced. That is, when wrapping up the display 106 around the body portion 108, the width of the display 106 is reducable to a small radius but the height is unchanged.

Accordingly, it would be desirable to provide a rollable display capable of being reduced in two dimensions, without impacting the device's portability and ease of use. Such a capability would also offer interesting product design opportunities.

In accordance with the invention, there is provided a rollable circular display device, comprising a display housing satisfying a requirement of having a length that is substantially smaller and at most one-half that of the total diameter of the circular display. Advantageously, by rolling the circular display onto a cone-shaped housing instead of a conventional cylinder housing, both the width and height of the display can be reduced to a small radius, without impacting the device's portability and ease of use.

In one embodiment, the rollable circular display device favorably comprises a housing in the contour of a truncated cone, a circular display expandable in two dimensions between a stored configuration in which the circular display is stored within the housing and an expanded configuration in which the circular display is fully viewable, and an inner cone, being arranged co-axially within the housing and rotatable within the housing, wherein the circular display is wound around the inner cone in the stored configuration.

In another embodiment, the rollable circular display device favorably comprises a body portion in the contour of a truncated cone, a circular display expandable in two dimensions between a stored configuration in which the circular display is wrapped around the body portion and an expanded configuration in which the circular display is fully viewable.

According to one aspect, in the rolled out position the ring shaped display forms an empty circular central region (i.e., a hole). The hole in the center of the display is required to prevent the circular display from being rolled up too tightly in that there is a limit to the roll up radius of a flexible display. In various embodiments, the hole may be used, for example, to embed a small rigid circular display, that is always visible, or by other functions, such as buttons or a touch pad.

Figure 2A:
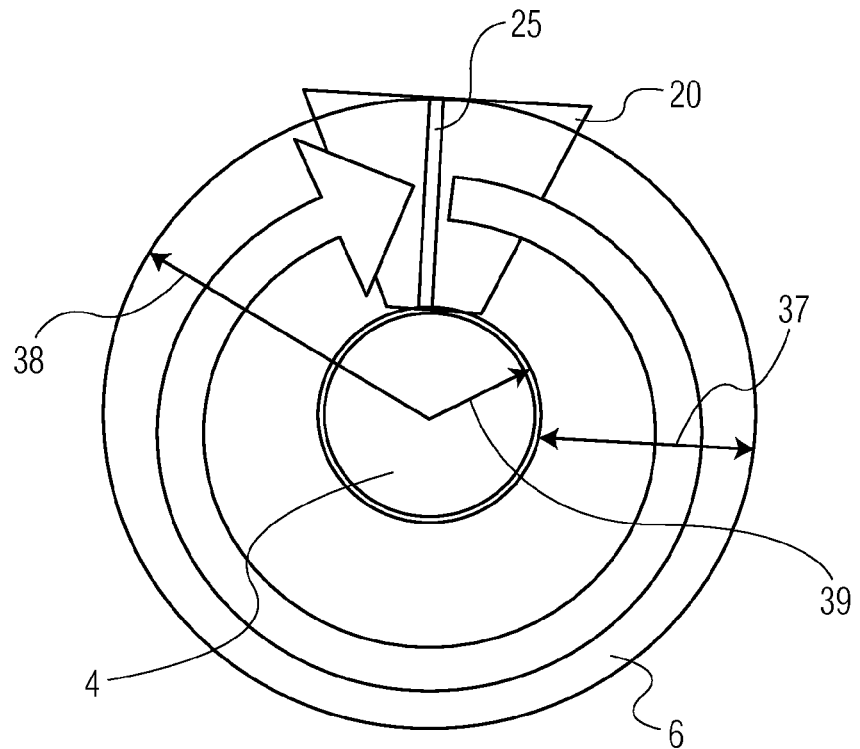
Figure 2B:
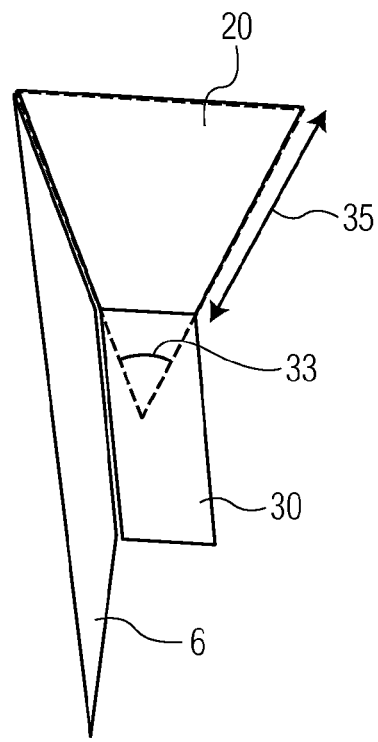
Figure 3:
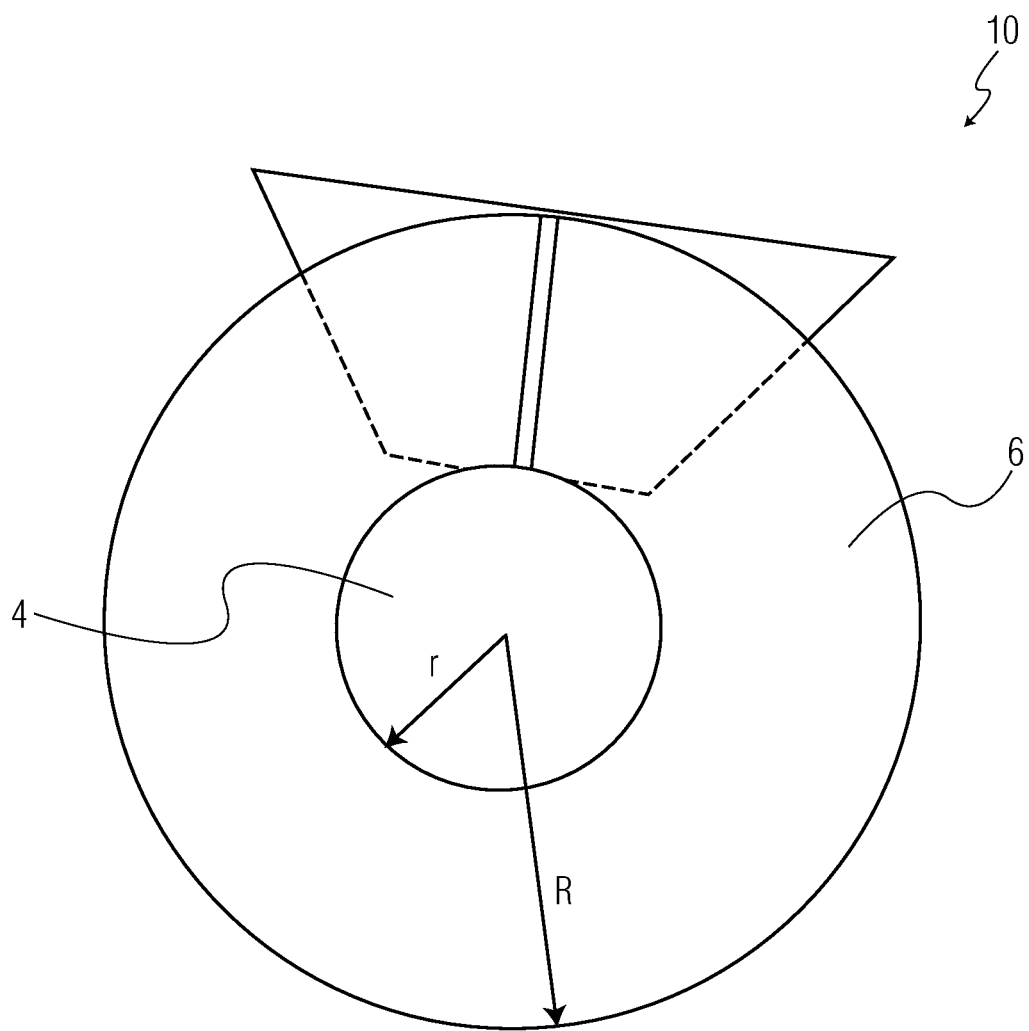
Figure 4A:
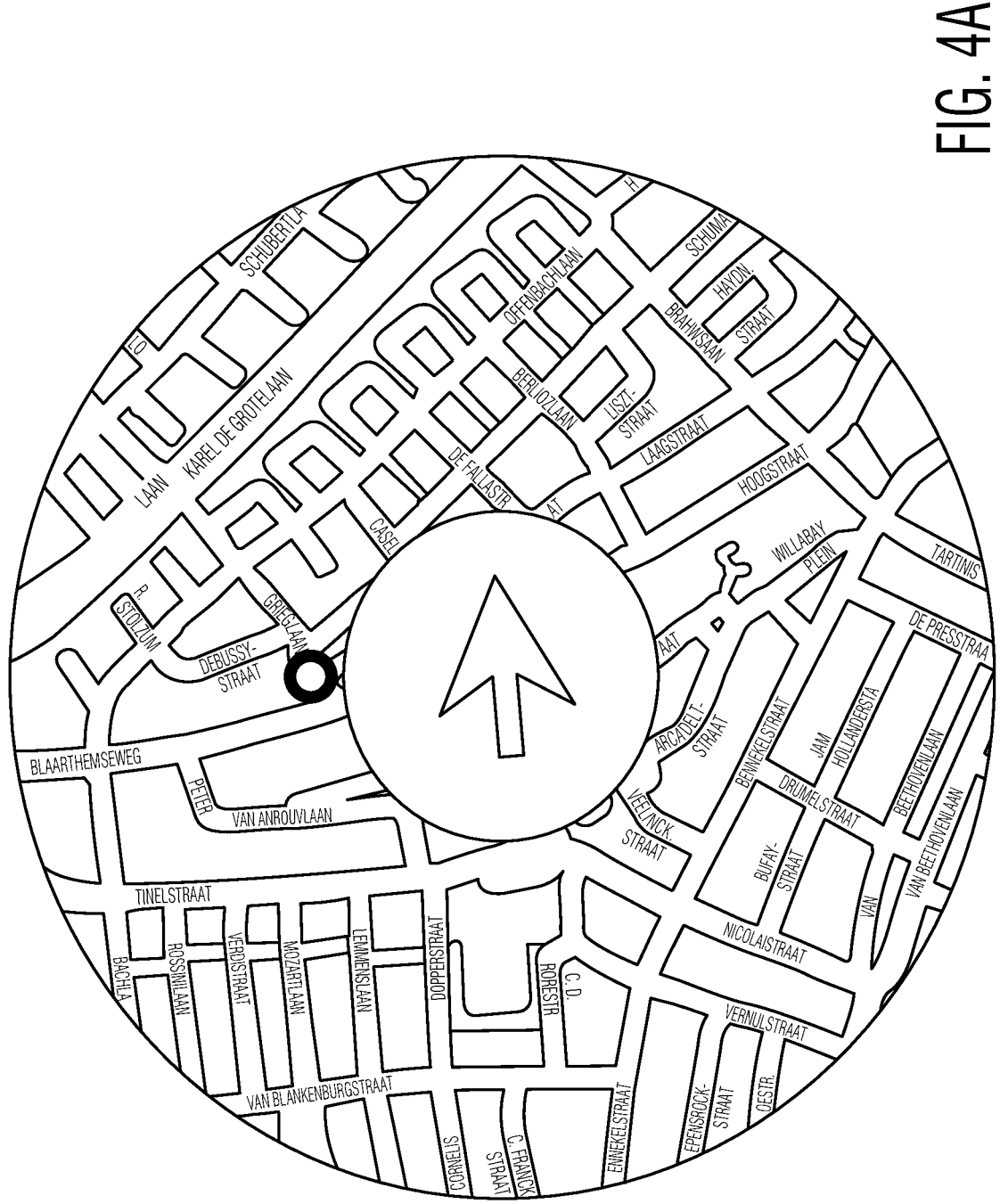
Figure 4B:
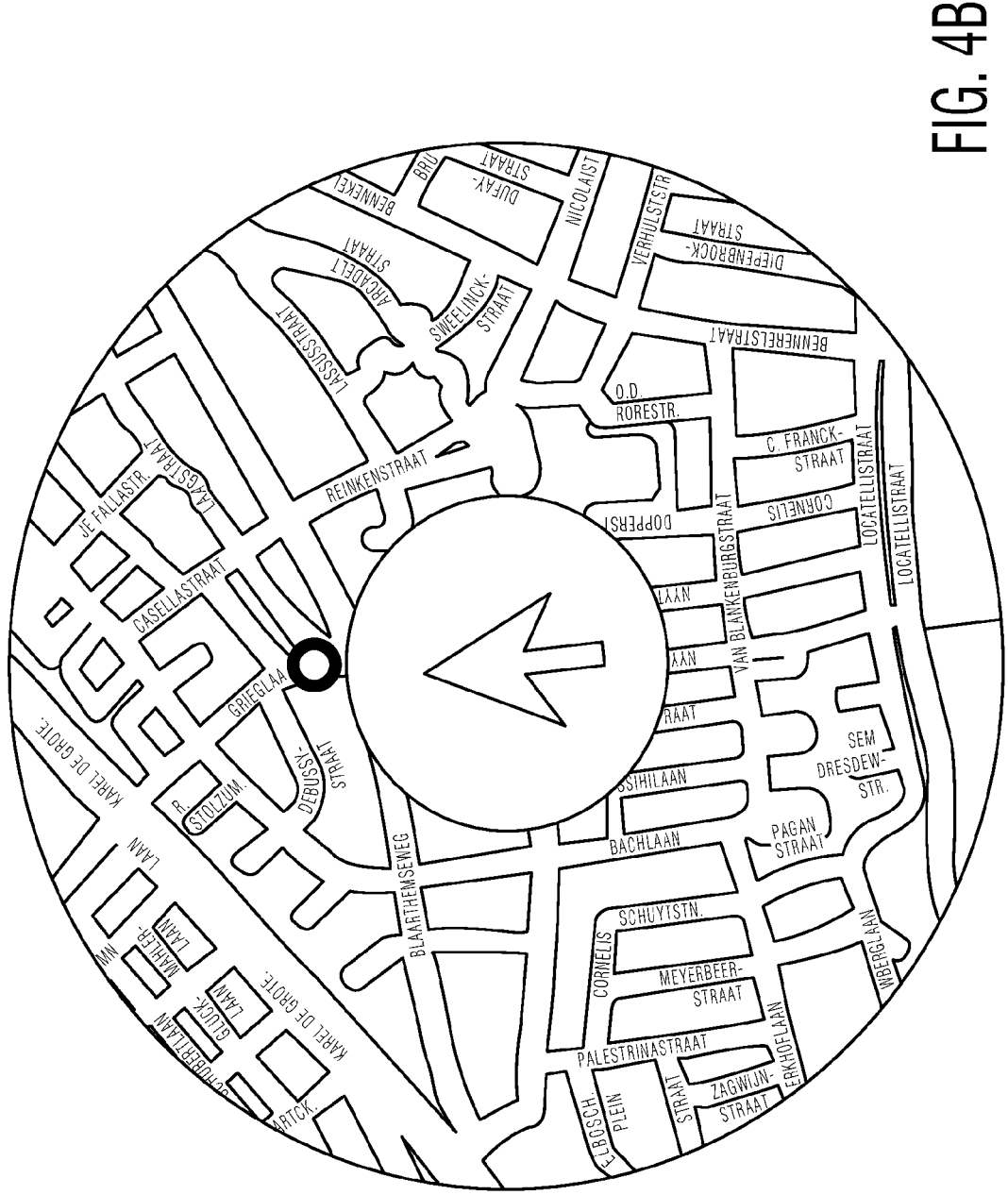
Figure 5:
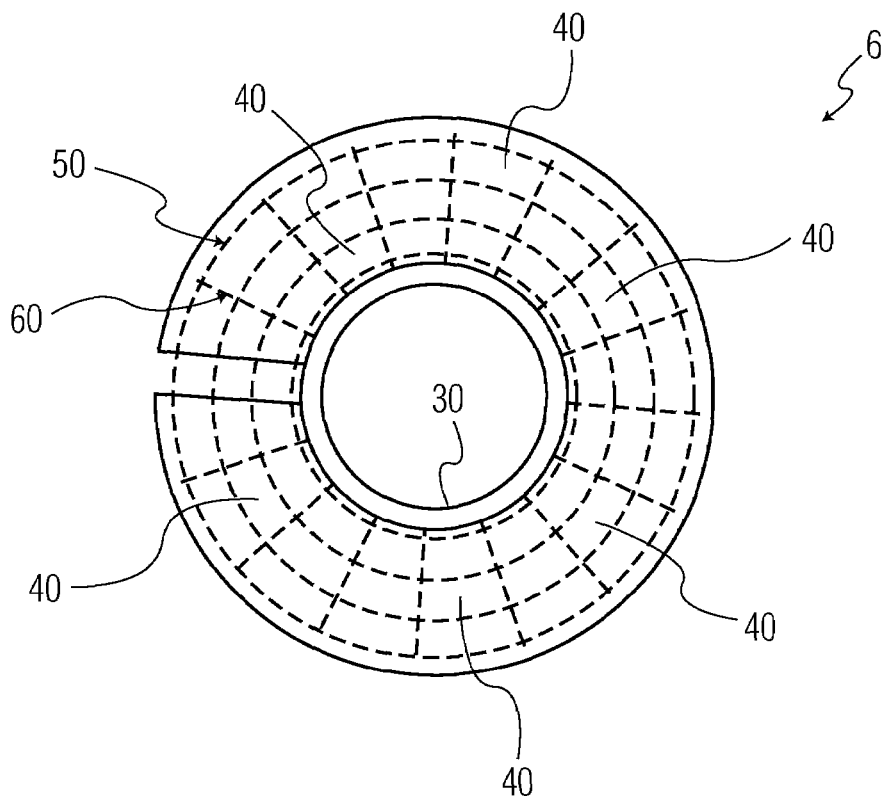
Figure 6:
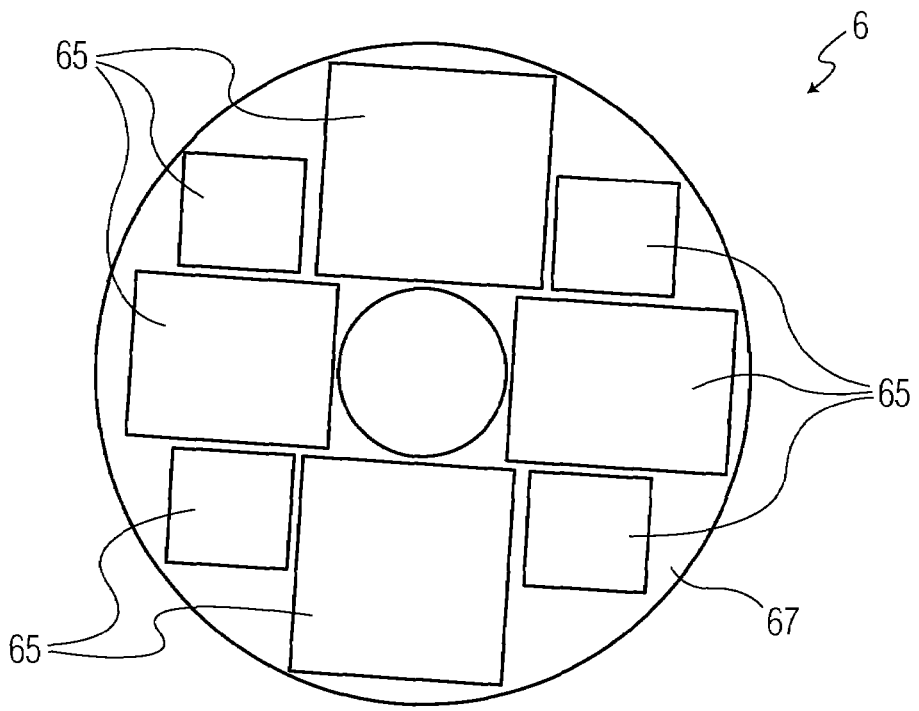
Figure 7:
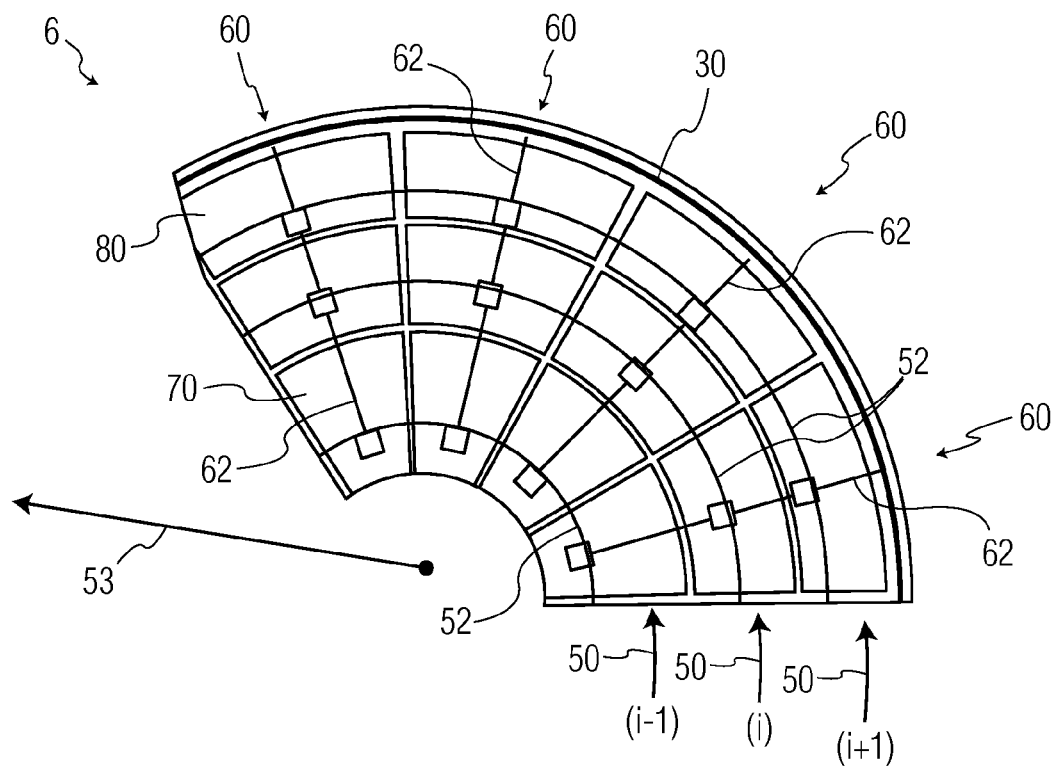
Figure 8:
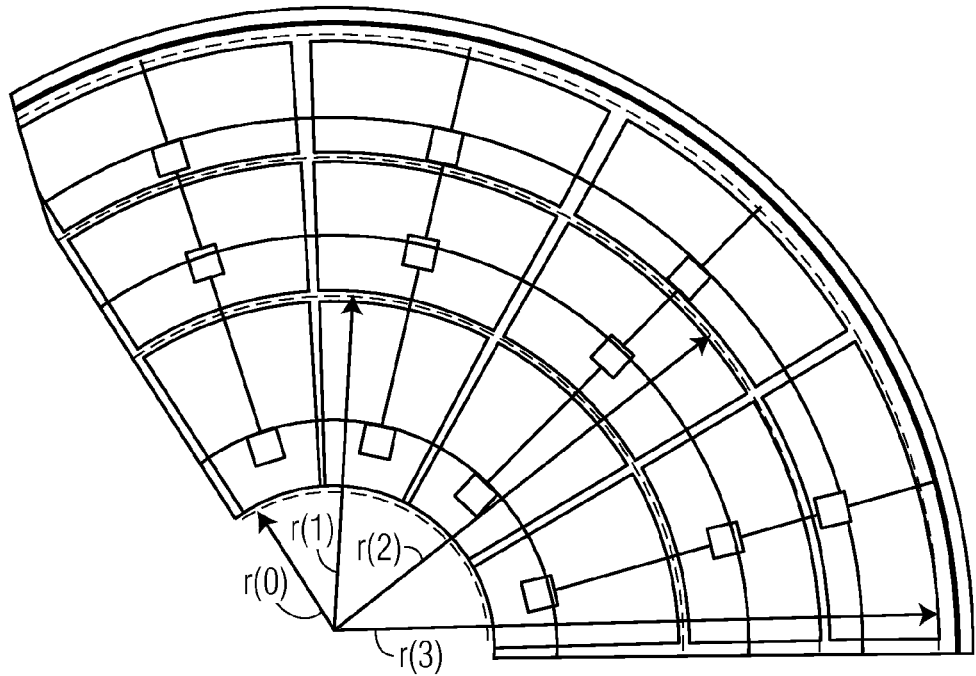
Figure 9:
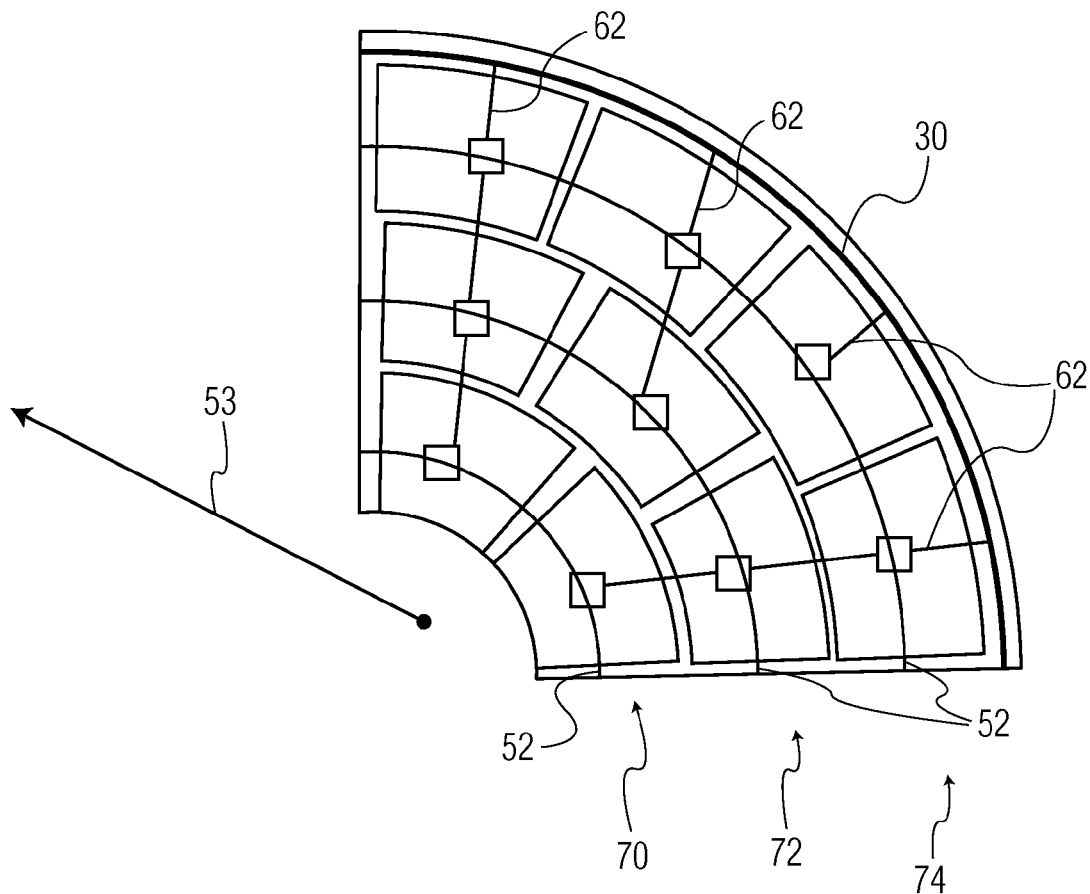
Figure 10:
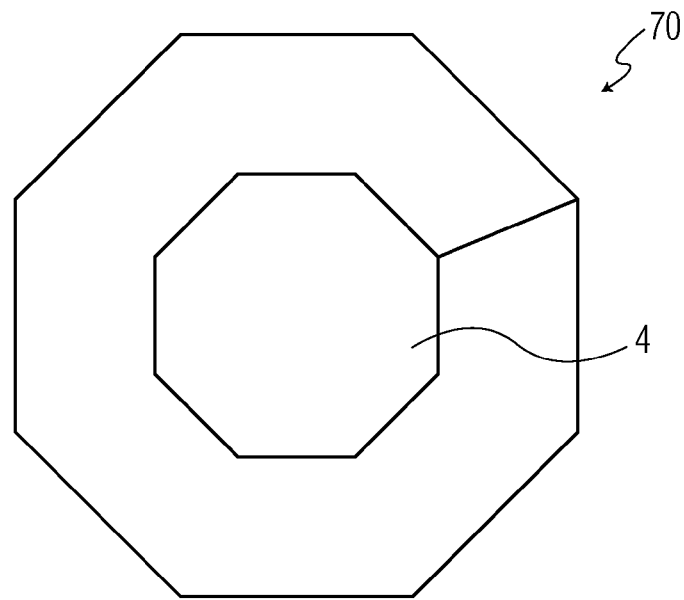

The foregoing features of the present invention will become more readily apparent and may be understood by referring to the following detailed description of an illustrative embodiment of the present invention, taken in conjunction with the accompanying drawings, where FIGS. 1a and 1b illustrates prior-art configurations of rollable display device, reducable in a single (horizontal) dimension, FIGS. 2a and 2b show in respective front and side views, a state of a rollable circular display device including a circular rollable display 6 in which the circular rollable display is rolled-out (extended), FIG. 3 is an illustration of the relationship of the maximum and minimum roll-up radii with respect to determining the overall product dimensions, FIGS. 4a and 4b illustrate one exemplary use of the empty circular central region of the circular rollable display, FIG. 5 shows a circular display design including a plurality of rectangular display areas, and FIG. 6 shows a circular display design including a plurality of rectangular display areas in accordance with one embodiment for forming a pixel structure for a circular display, FIG. 7 is an exploded view of a portion of the circular display design of FIG. 5 according to one embodiment, FIG. 8 is the exploded view of FIG. 7 for further illustrating the relation for the boundaries r(i) in the radial direction between pixel row i−1 and pixel row I, FIG. 9 is an exploded view of a portion of the circular display design of FIG. 5 for resolving an undesirable resolution gradient according to one embodiment, FIG. 10 is an illustration of an octagonal shaped display, according to an embodiment of the present invention, and FIG. 11A-11D are illustrations of body portions having different geometries, according to different embodiments of the present invention.

Although the following detailed description contains many specifics for the purpose of illustration, one of ordinary skill in the art will appreciate that many variations and alterations to the following description are within the scope of the invention. Accordingly, the following embodiments of the invention is set forth without any loss of generality to, and without imposing limitations upon, the claimed invention.

As illustrated in the accompanying diagrams, the present invention is an improved rollable circular display device whose width and height can be reduced to a small radius, without impacting the device's portability and ease of use.

The embodiments of the rollable display device in accordance with the present invention are described with reference to the drawings in FIGS. 2-11.

In accordance with an exemplary embodiment, FIGS. 2a and 2b show in respective front and side views, a state of a rollable circular display device 10 including a circular rollable (i.e., windable) display 6 in which the circular rollable display 6 is rolled-out (extended). The circular rollable display 6 includes an empty circular central region 4 (i.e., a hole) formed by the circular rollable display 6 in the rolled-out (extended) position.

A housing 20 is in the form of a truncated solid cone to roll up the circular rollable display 6. However, other shapes are within contemplation of the invention which will afford similar reduction in overall volume in a rolled up state. The truncated cone shaped housing 20 comprises a slit 25, for extending the rollable display from a rolled-up position to the rolled-out (extended) position, as shown. In the side view of FIG. 2b, the circular rollable display 6 is shown to be slightly cone shaped to provide more mechanical stability in the rolled out position.

As shown in FIG. 2a, the circular rollable display 6 is shown rolled out in a clockwise direction as indicated by the arrow. Of course, the circular rollable display can also roll out in a counter-clockwise direction. The extended position is achieved by fixing the two ends of the display. For example, one end of the display can be fixed by a roll-out mechanism, locking the display when it is rolled out to its maximum degree. The other end of the display can be attached to the slit in the truncated cone shaped housing 20.

As shown in FIG. 2b, the circular rollable display 6 in the rolled out position assumes the shape of a shallow cone. This shallow cone shape makes the display 6 more stable in the rolled out position. Optionally, FIG. 2b includes a supporting member 30 in the shape of a parallelogram. In the exemplary embodiment, the supporting member 30 supports an inner rim of the ring shaped display 6 in the rolled-out (extended) position and further supports any functions that may be utilized in the an empty circular central region 4, described as follows.

The rollable display 6 has minimum roll-up radius that is determined by the mechanical properties of the display, and a maximum roll-up radius that is determined by the both the minimum roll-up radius and the ratio of the inner (hole) radius (r) and outer radius (R) of the display 6. For example, if the outer radius R of the display 6 is three times the inner radius r, the maximum roll-up radius is three times (3×) the minimum roll-up radius. It should be understood that the maximum and minimum roll-up radii are critical with respect to determining the overall product dimensions.

This relationship is further illustrated with reference to FIGS. 2 and 3.

A fundamental relationship for the rollable display 6 of the invention may be computed as:

$$R/r = \text{constant} \quad [1]$$

where R represents the largest radius of the display 6 and r represents the smallest radius of the display, as shown in FIG. 3. Equation (1) illustrates that the ratio of the largest R radius and smallest radius r of the display 6 is independent of the top angle 33 (see FIG. 2) of the cone onto which it is rolled up, or otherwise forced to conform to. It is noted that the ratio of equation (1) also holds true in the case where the display is rolled out into a completely flat configuration. By way of example, for a display having an outer radius, R=90 mm, and a hole radius, r=30 mm, equation (1) is computed as:

$$R/r = 90/30 = 30 \quad [2]$$

As discussed above, this ratio determines the minimum and maximum roll up radius. Therefore, if the display 6 is rolled up to a minimum radius of 5 mm, for example, the maximum roll up radius, R, at the top of the truncated cone shaped housing 20, is determined by equation (1) to be 15 mm. Therefore we may conclude that width of the truncated cone shaped housing 20 is twice the maximum roll up radius (e.g., 2×15=30 mm). The length 35 (see FIG. 2) of the truncated cone shaped housing 20 is bound by the width 37 (see FIG. 2) of the ring shaped display 6 and may be computed as the difference between the outer radius 38 of the display 6 and the radius 39 of the central region 4:

$$\text{Width of display ring} = \text{outer radius of display} - \text{radius of empty central region} \quad [3]$$

$$\text{Width of display ring} = 90 \text{ mm} - 30 \text{ mm} = 60 \text{ mm} \quad [4]$$

Knowing the width 37 and length 35 of the truncated cone shaped housing 20, the minimum container size may be determined as 30 (h)×30 (l)×60(w) mm.

According to one aspect, the empty circular central region 4 formed by the rollable display 6 in the rolled-out (extended) position can remain unused or otherwise be used for a wide variety of applications.

FIGS. 4a and 4b illustrate one exemplary use of the central area 4. As shown in FIGS. 4a and 4b, a compass device is mounted in the central area 4. Support for the compass device can be supplied by supporting member 30 (as shown in FIG. 1). It is contemplated to utilize the compass and associated display 6 as a navigation guidance system, whereby a map is displayed on the display 6 to a user with the user's current location positioned above the central area and the compass, which can be a magnetic compass, points to true North. It should be appreciated that there is no mechanical or electrical coupling between the compass and the display 6. However, other contemplated uses may include a mechanical and/or electrical interface. For example, one contemplated use involves a touch screen in the central area 4 configured to display at least one soft touch button for user interface, such as for controlling applications displayed on the display 6, and/or controlling various modes and display options, including controlling display orientation, size, brightness, contrast and the like.

One consequence of using a circular display is that the standard pixel matrix structure associated with conventional rectangular displays is not directly applicable to circular displays.

FIG. 5 shows a circular display design including a plurality of display areas 40 in accordance with one embodiment for forming a pixel structure for a circular display. Each display area 40 corresponds to a single pixel. In one embodiment, the pixel contains an active element, such as a thin film transistor constructed of a polymer semi-conducting material. Each pixel is connected to a single row 50 wire and a single column 60 wire. The pixel is further connected to a pixel pad on which a charge is stored. On top of the pixel is a layer of electrophoretic material that changes in reflectivity under the influence of an electric field. Of course, in other embodiments, the pixel may be a polyled display, in which case the pixel may be an organic LED, or an LCD display constructed of a TFT, pixel pad and LCD cell.

An inner circular routing area 30 is shown which is a region of the circular display used to route the row 50 and column 60 electrodes to each display area 40. In another embodiment, the routing area 30 can be located on an outer rim of the circular display 6. In yet another embodiment, it is contemplated to use a combination an inner and outer routing areas.

An inner routing area 30 configuration provides advantages over an outer routing area configuration, such as, requiring shorter wires and minimal surface area. Further, because the routing areas do not include display hardware, the display is appreciably thinner in these areas, allowing a smaller roll-up radius. The use of a routing area 30 enhances display quality and further facilitates manufacturability of the device by keeping the wiring outside of the active display areas 40. One undesirable consequence of utilizing routing areas is that less than the total area of the display is used for pixels.

FIG. 6 illustrates another embodiment of a circular display design which includes a plurality of discrete display areas 65 of various shapes and sizes. In the illustrative embodiment, eight discrete display areas are shown. However, other embodiments may include different numbers of display areas 65. In addition to the display areas 65, there is shown a routing area 67. The routing area 67 simultaneously services all of the display areas 65. In the present embodiment, it is contemplated to use conventional rectangular displays for the display areas 65 having well known properties.

FIG. 7 is an exploded view of a portion of the circular display design of FIG. 5 for resolving an undesirable resolution gradient according to one embodiment. As shown in FIG. 7, the pixel rows 50 run perpendicular to the display radius 53, and the pixel columns 60 run parallel to the display radius 53. The undesirable resolution gradient results in non-rectangular pixels that are larger on the outside (e.g., pixel 80) of the display radius than on the inside (e.g., pixel 70). To resolve this undesirable resolution gradient, it is contemplated to apply a radial gradient to the row electrode spacing in the radial direction 53. Specifically, as you move along the radius 53 from the inside to the outside of the circular display 6, the row electrodes 52 are spaced at increasingly smaller distances. This radial gradient allows the pixel height to decrease as the pixel width increases moving outward in the radial direction thereby maintaining the overall surface area of the pixel as a constant.

In one exemplary embodiment, the gradient is such that the pixel surface area is kept constant for all pixels, by choosing the following relation for the boundaries r(i) in the radial direction between pixel row i−1 and pixel row i:

$$r(i) = sqrt[(R^2 - r^2)(i/M) + r^2],  \quad [5]$$

where M is the number of pixel rows. In the illustrative embodiment shown in FIG. 7, M=3.

From equation [5] and the general expression for the surface area A (i) of one pixel located on row i:

$$A(i) = \pi (r(i+1)^2 - r(i)^2)/N, \quad [6]$$

where r(i+1) is the outside radius of the pixel, r(i) is the inside radius of the pixel and N is the number of pixels on a full circle, it can be derived that the surface area for all pixels is a constant that may be computed as:

$$A(i) = \pi (R^2 - r^2)/(MN) = \text{constant} \quad [7]$$

It should be appreciated that other embodiments may use different gradients for the row electrode spacing to partially compensate for the resolution gradient.

FIG. 8 is the exploded view of FIG. 7 for further illustrating the relation for the boundaries r(i) in the radial direction between pixel row i−1 and pixel row i. FIG. 8 shows four row boundaries, namely, r(0), r(1), r(2) and r(3).

FIG. 9 is an exploded view of a portion of the circular display design of FIG. 5 for resolving an undesirable resolution gradient according to another embodiment. As shown in FIG. 9, the pixel rows 50 run perpendicular to the display radius 53. In the present embodiment, the undesirable resolution gradient, discussed above, is resolved by including more pixels to the outer rows of the display 6 as compared with the inner rows (i.e., by applying a gradient to the number of pixels on a row N). As shown, the innermost row 70 of a portion of the display includes 2 pixels, the next row 72 includes 3 pixels and the outermost row 74 includes 4 pixels. That is, the number of pixels in each row is a function of the row number. In this manner, the pixel row electrode spacing is maintained constant.

In the present exemplary embodiment, the gradient is such that the surface area is kept constant for all pixels, by choosing the following relations for the number of pixels N(i) on row i and for the boundaries r(i) between pixel row i−1 and pixel row i:

$$r(i) = (R-r)(i/M) + r, \quad [8]$$

$$N(i) = N \cdot [(R-r)(2i+1) + 2M \cdot r]/[M \cdot (R+r)], \quad [9]$$

where N and M represent free parameters, where N corresponds to the average number of pixels on a row and M corresponds to the number of rows in the display 6.

Using formulas [8] and [9], the pixel surface area A(i) may be computed as:

$$\begin{aligned} A(i) &= \pi [r(i+1)^2 - r(i)^2]/N(i) \quad [10]\\ &= \pi [\{(R-r)((i+1)/M) + r\}^2 - \{(R-r)(i/M) + r\}^2]/\\ &\quad \{N \cdot [(R-r)(2i+1) + 2M \cdot r]/[M \cdot (R+r)]\}\\ &= \pi (R+r)(R-r)[2\{(R-r)(i/M) + r\} + (R-r)(1/M)]/\\ &\quad \{N \cdot [(R-r)(2i+1) + 2M \cdot r]\}\\ &= \pi (R^2 - r^2)/(M \cdot N) \end{aligned}$$

The astute reader will recognize that, as compared with equation [7] above, equation [10] illustrates that each pixel in the rollable circular display 6 has an equivalent surface area, independent of the particular row in which it is located. In other words, equation [10] is independent of the row parameter i. In this manner, the undesirable resolution gradient is resolved.

It should be appreciated that the present invention contemplates that, in other embodiments, different gradients can be applied to the number of pixels on a row to provide a partial compensation for the resolution gradient.

In another embodiment, it is also contemplated to add electrodes in a direction parallel to the radius of the display. The additional electrodes (62) preferably feed from an outer rim of the display. This is preferred because there is significantly less overlap of electrodes in the active display areas 40 as a consequence of having shorter wire runs.

It is also contemplated to use a combination of the two afore-mentioned approaches for reducing the undesirable gradient effect.

As a further solution, it is also contemplated to sub-divide the row electrodes 50, starting at a certain prescribed radius and moving in the direction of the outside of the circular display 6.

FIG. 10 is an illustration of an octagonal shaped display 70, according to an embodiment of the present invention. The octagonal shaped display 70 includes an empty circular central region 4 similar to the one shown in FIGS. 2-9 for the circular display 6. It should be appreciated that the invention contemplates the use of a multiplicity of different shapes, including, without limitation, those explicitly illustrated herein (i.e., the circular display shape illustrated in FIGS. 2-9 and the octagonal shaped display 70 illustrated in FIG. 10).

Figure 11A:
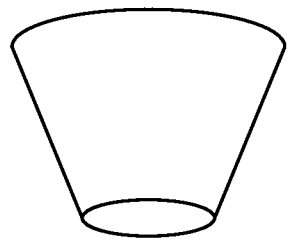
Figure 11B:
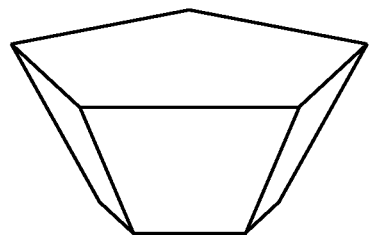
Figure 11C:
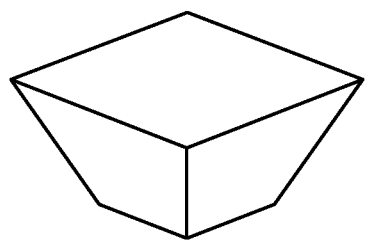
Figure 11D:
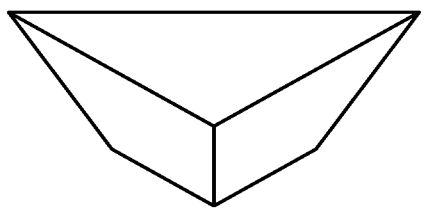

FIG. 11A-D is an illustration of body portions having different geometries wherein a display may be wrapped around the body portion and wherein the display is fully viewable in an expanded configuration. FIG. 11A refers to the truncated cone shape 20, referred to in FIGS. 2a and 2b and FIGS. 11B-D illustrate pyramid shapes that are ideally suited for use with displays such as the octagonal display 70 shown in FIG. 10.

In interpreting the appended claims, it should be understood that:
  a) the word "comprising" does not exclude the presence of other elements or acts than those listed in a given claim;
  b) the word "a" or "an" preceding an element does not exclude the presence of a plurality of such elements;
  c) any reference signs in the claims do not limit their scope;
  d) several "means" may be represented by the same item or hardware or software implemented structure or function;
  e) any of the disclosed elements may be comprised of hardware portions (e.g., including discrete and integrated electronic circuitry), software portions (e.g., computer programming), and any combination thereof;
  f) hardware portions may be comprised of one or both of analog and digital portions;
  g) any of the disclosed devices or portions thereof may be combined together or separated into further portions unless specifically stated otherwise; and
  h) no specific sequence of acts is intended to be required unless specifically indicated.

We claim:

1. A rollable circular display device, comprising:
  a ring-shaped display expandable in two dimensions between a stored configuration and an expanded configuration, and
  a body for winding the ring-shaped display in the stored configuration,
  wherein the ring-shaped display forms an empty circular central region in the expanded configuration.

2. The display device of claim 1, wherein the body is a truncated conic solid.

3. The display device of claim 2, wherein the truncated conic solid is a truncated cone.

4. The display device of claim 1, wherein the ring-shaped display is a circular display.

5. The rollable circular display device of claim 1, wherein the empty circular central region is adaptable for displaying ancillary information.

6. The rollable circular displays device of claim 1, wherein the body has a length that is less than the diameter of the ring-shaped display in the expanded configuration.

7. The rollable circular display device according to claim 1, further comprising a supporting member fixedly attached to a lower face portion of the body for supporting an inner rim of the circular display in the expanded configuration.

8. The rollable circular display device according to claim 1, wherein the circular display comprises:
  a plurality of display areas organized in concentric circles, and
  a routing area for routing row and column electrodes to the plurality of rectangular display areas.

9. The rollable circular display device according to claim 8, wherein the routing area is located on one of an outer rim and an inner rim of the rollable circular display.

10. The rollable circular display device according to claim 8, wherein a first routing area is located on an inner rim of the rollable circular display and a second routing area is located on an outer rim of the rollable circular display.

11. The rollable circular display device according to claim 8, where the number of pixels located in an "ith" row, N(i), of the display is a function of a row number, i.

12. The rollable circular display device according to claim 11, wherein the number of pixels N(i) in the ith row is computed as:

$$N(i)=N\cdot[(R-r)(2i+1)+2M\cdot r]/[M\cdot(R+r)]$$

where R is the outside radius of the active area of the display,
r is the inside radius of the active area of the display,
M is the number of rows on the display, and
N is the average numbers of pixels on a row of the display.

13. The rollable circular display devices according to claim 8, where an inner radius of pixels on an "ith" row, r(i), of the display devices is computed as:

$$r(i)=(R-r)(i/M)+r$$

where R is the outside radius of the active area of the display,
r is the inside radius of the active area of the display, and
M is the number of rows on the display.

14. The rollable circular display device according to claim 8, wherein the pixel height of pixels located in an "ith" row, r(i+1)−r(i), of the display device is a function of a row number, i.

15. The rollable circular display device according to claim 14, where the inner radius of the pixels on the "ith" row, r(i), of the display device is computed as $$r(i)=sqrt[(R^2-r^2)(i/M)+r^2]$$

where R is the outside radius of the pixel,
r is the inside radius of the pixel, and
M is the number of rows on the display.

16. The rollable circular display device according to claim 8, wherein the circular display comprises:
  a plurality of rectangular display areas, and
  a routing area for routing row and column electrodes to the plurality of rectangular display areas.

17. The rollable circular display device according to claim 1, wherein the circular display is a bi-stable display.

18. A rollable circular display device, comprising:
  a housing,
  a circular display expandable in two dimensions between a stored configuration in which said circular display is stored within said housing and an expanded configuration in which said circular display is fully viewable, and
  an inner cone, being arranged co-axially within said housing and rotatable within said housing, wherein the circular display is wound around the inner cone in the stored configuration,
  wherein the circular display forms an empty circular central region in the expanded configuration.

19. The rollable circular display device of claim 18, wherein the housing has a length that is less than the diameter of the circular display in the expanded configuration.

20. The rollable circular display device according to claim 19, further comprising a supporting member fixedly attached to a lower face portion of the housing for supporting an inner rim of the circular display in the expanded configuration.

21. The rollable circular display device according to claim 18, wherein the circular display is a bi-stable display.

22. The rollable circular display device according to claim 18, wherein a first end of the circular display is attached to the inner cone via a roll-out mechanism.

23. The rollable circular display device according to claim 18, wherein the roll-out mechanism locks to maintain the circular display in the extended position.

24. The rollable circular display device according to claim 18, wherein a second end of the circular display 6 is attachable to the housings in the extended position.

25. The rollable circular display device according to claim 18, wherein the circular display may be expanded from the stored configuration to the expanded configuration in one of a clockwise and counter-clockwise direction.

26. The rollable circular display device according to claim 18, wherein the housing further comprises a slits along a major axis for enabling the circular display to transition from the stored configuration to the expanded configuration.

27. The rollable circular display device of claim 18, wherein the empty circular central region is adaptable for displaying ancillary information.

28. The rollable circular display device according to claim 18, wherein the circular display comprises:
 a plurality of display areas organized in concentric circles, and
 a routing area for routing row and column electrodes to the plurality of rectangular display areas.

29. The rollable circular display device according to claim 28, wherein the routing area is located on one of an outer rim and an inner rim of the rollable circular display.

30. The rollable circular display device according to claim 28, wherein a first routing area is located on an inner rim of the rollable circular display and a second routing area is located on an outer rim of the rollable circular display.

31. The rollable circular display devices according to claim 28, where the number of pixels located in an "ith" row, N(i), of the display is a function of a row number, i.

32. The rollable circular display device according to claim 31, wherein the number of pixels N(i) in the ith row is computed as:

$$N(i)=N \cdot [(R-r)(2i+1)+2M \cdot r]/[M \cdot (R+r)]$$

where R is the outside radius of the active area of the display,
r is the inside radius of the active area of the display,
M is the number of rows on the display, and
N is the average numbers of pixels on a row of the display.

33. The rollable circular display device according to claim 28, where an inner radius of pixels on an "ith" row, r(i), of the display device is computed as:

$$r(i)=(R-r)(i/M)+r$$

where R is the outside radius of the active area of the display,
r is the inside radius of the active area of the display, and
M is the number of rows on the display.

34. The rollable circular display device according to claim 28, wherein the pixel height of pixels located in an "ith" row, r(i+1)−r(i), of the display device is a function of a row number, i.

35. The rollable circular display device according to claim 34, where the inner radius of the pixels on the "ith" row, r(i), of the display device is computed as $$r(i)=sqrt[(R^2-r^2)(i/M)+r^2]$$

where R is the outside radius of the pixel,
r is the inside radius of the pixel, and
M is the number of rows on the display.

\* \* \* \* \*